(12) United States Patent
Phillips et al.

(10) Patent No.: US 12,042,065 B1
(45) Date of Patent: Jul. 23, 2024

(54) INTERLOCKING FRAME ASSEMBLY

(71) Applicant: BCW Diversified, Inc., Middletown, IN (US)

(72) Inventors: Andrew Michael Phillips, Monroe, GA (US); Ted Garrett Litvan, Indianapolis, IN (US); Garry Martin Dale, II, Anderson, IN (US); Randy Williams, Ningbo (CN); Cindy Zhou, Ningbo (CN)

(73) Assignee: BCW Diversified, Inc., Middletown, TN (US)

( * ) Notice: Subject to any disclaimer, the term of this patent is extended or adjusted under 35 U.S.C. 154(b) by 97 days.

(21) Appl. No.: 17/568,350

(22) Filed: Jan. 4, 2022

(51) Int. Cl.
| | |
|---|---|
| G09F 1/12 | (2006.01) |
| A47B 47/00 | (2006.01) |
| A47B 47/04 | (2006.01) |
| A47F 3/12 | (2006.01) |
| A47G 1/06 | (2006.01) |
| A63H 33/10 | (2006.01) |
| F16B 5/06 | (2006.01) |
| F16B 12/12 | (2006.01) |
| G09F 3/14 | (2006.01) |
| G09F 7/04 | (2006.01) |

(52) U.S. Cl.
CPC ............ *A47F 3/12* (2013.01); *A47B 47/0075* (2013.01); *A47B 47/042* (2013.01); *A47B 47/047* (2013.01); *A47G 1/065* (2013.01); *A63H 33/107* (2013.01); *A63H 33/108* (2013.01); *F16B 5/0614* (2013.01); *F16B 12/125* (2013.01); *A47B 2230/0096* (2013.01)

(58) Field of Classification Search
CPC ..... G09F 1/12; G09F 15/0012; G09F 15/0068
See application file for complete search history.

(56) References Cited

U.S. PATENT DOCUMENTS

| | | | |
|---|---|---|---|
| 3,339,302 | A | 9/1967 | Mallory |
| 3,428,108 | A | 2/1969 | Singer |
| 3,471,959 | A | 10/1969 | Seger |
| 3,523,382 | A | 8/1970 | Dreyer |
| 3,529,374 | A | 9/1970 | Spertus |
| 3,648,393 | A | 3/1972 | Parrilla |
| 3,673,723 | A | 7/1972 | Lazar et al. |

(Continued)

FOREIGN PATENT DOCUMENTS

| | | |
|---|---|---|
| EP | 0370123 A1 | 5/1990 |
| WO | 2007094023 A1 | 8/2007 |
| WO | 2011035358 A1 | 3/2011 |

*Primary Examiner* — Shin H Kim
(74) *Attorney, Agent, or Firm* — Hanrahan Law Firm, P.A.; Benjamin M. Hanrahan

(57) ABSTRACT

ABSTRACT An interlocking frame for selective engagement with a plurality of adjoining interlocking frames is presented herein. The frame includes a frame body that defines an interior portion at least partially enclosed by a plurality of interior walls, a front face, a rear face, and a plurality of peripheral walls. The interlocking frame also includes a plurality of locking tabs each selectively and independently rotationally disposable between a retracted position and an extended position relative to the frame body. Each of the locking tabs has an arm that extends beyond the frame body when the locking tab is disposed in the extended position in order to engage with a corresponding locking slot of an adjacent frame.

20 Claims, 13 Drawing Sheets

(56) References Cited

U.S. PATENT DOCUMENTS

| | | |
|---|---|---|
| 3,673,724 A | 7/1972 | Bell et al. |
| 3,722,122 A | 3/1973 | Sesto |
| 4,017,989 A | 4/1977 | Murray |
| 4,244,127 A | 1/1981 | Buzzard |
| 4,432,152 A | 2/1984 | Daenen |
| 4,532,727 A | 8/1985 | Klose et al. |
| 4,553,344 A | 11/1985 | Rubin et al. |
| 4,608,770 A | 9/1986 | Gray |
| 4,624,067 A | 11/1986 | Kristofich |
| 4,712,322 A | 12/1987 | Rubin |
| 4,912,863 A | 4/1990 | Harvey |
| 4,964,231 A | 10/1990 | De Maat et al. |
| 5,220,952 A | 6/1993 | Beaulieu |
| 5,544,436 A | 8/1996 | Lefkowitz |
| 5,544,438 A * | 8/1996 | Fazekas ............ G09F 1/12 40/733 |
| 5,588,240 A | 12/1996 | Zilliox |
| D406,468 S | 3/1999 | Byers |
| 6,230,428 B1 | 5/2001 | Albin |
| 6,338,215 B1 | 1/2002 | Vincent |
| 6,705,034 B1 | 3/2004 | Cahill |
| 7,363,739 B2 * | 4/2008 | Dalsey ............ A47G 1/065 40/776 |
| 9,687,091 B2 * | 6/2017 | Jhagroo ............ A47G 1/065 |
| 10,786,098 B1 | 9/2020 | Martin |
| 10,878,731 B2 | 12/2020 | Koeppel et al. |
| 2005/0016045 A1 * | 1/2005 | Lasher ............ G09F 15/0012 40/759 |
| 2007/0234621 A1 | 10/2007 | McCorkle |
| 2007/0289187 A1 | 12/2007 | Vincent |
| 2014/0007471 A1 | 1/2014 | Ottolenghi |
| 2014/0047747 A1 | 2/2014 | Jackson |
| 2014/0237875 A1 * | 8/2014 | Randall ............ A47G 1/065 40/797 |
| 2015/0258843 A1 | 9/2015 | Geiser |
| 2018/0199736 A1 * | 7/2018 | Spiro ............ A47G 1/101 |

\* cited by examiner

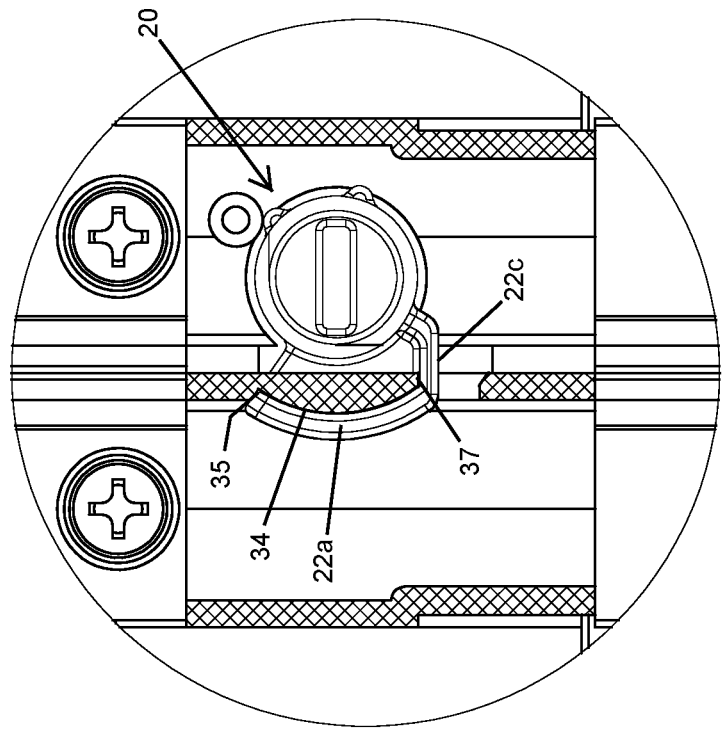
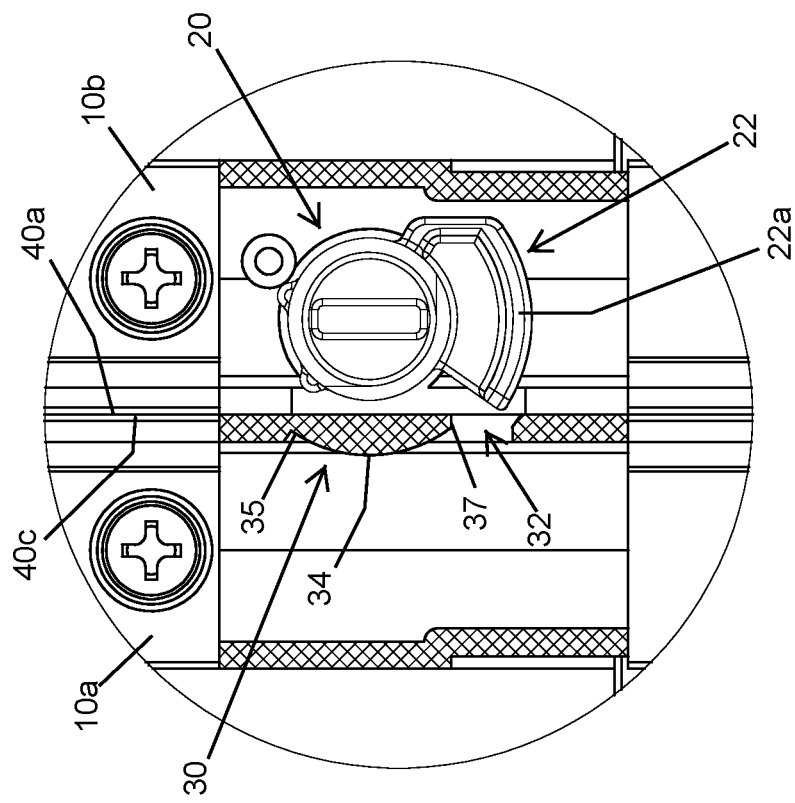
FIG. 9A
FIG. 9B

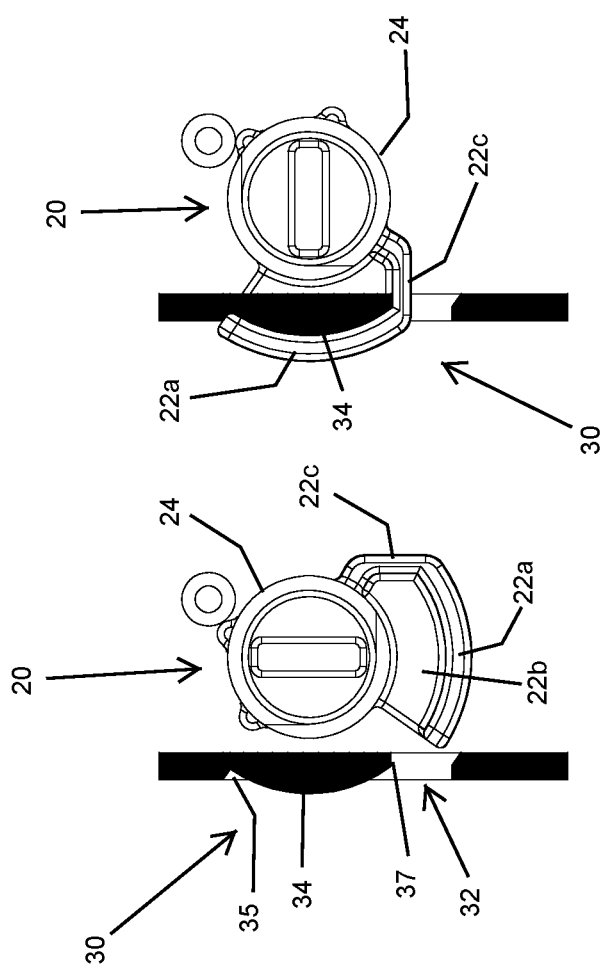

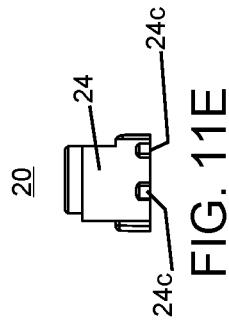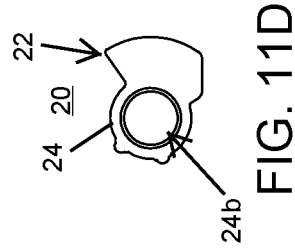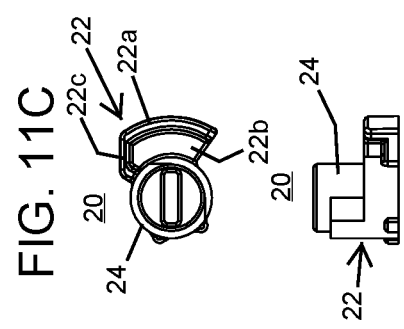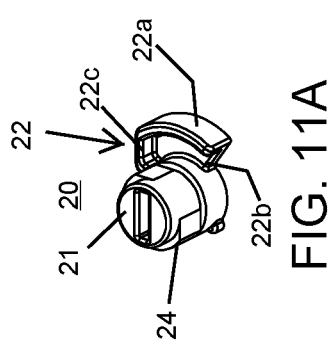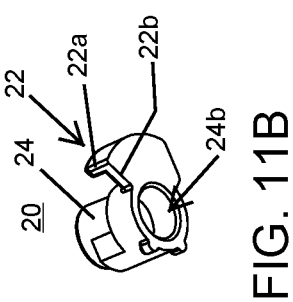

INTERLOCKING FRAME ASSEMBLY

FIELD OF THE INVENTION

The present invention is generally directed to an interlocking frame or display case, and more specifically to a frame or display case that features, among other items, interlocking toggle latches or tabs that engage with similarly-constructed, adjacently-disposed frames or display cases to removably connect or lock the frames to one another.

BACKGROUND OF THE INVENTION

It is common for people to obtain or collect items for display in a home, office, residential facility, commercial establishment such as a restaurant, or other location. Those items can include virtually any articles or objects including, but in no way limited to photographs, paintings, pictures, drawings, collectibles, comic books, stamps, books, newspapers, cards, trading cards, playing cards, memorabilia, sports balls such as baseballs, footballs, soccer balls, sporting equipment such as baseball gloves, boxing gloves, bats, hats, figurines, statuettes, etc.

Typical framing for pictures or photographs can be costly and can have long production times, particularly if they are custom made or custom ordered and generally do not include a way to connect multiple frames together in a side-by-side or grid-like manner.

Accordingly, there is a need in the art for a frame or display case that can be easily customized in that the frame or display case may advantageously include an interlocking feature in which multiple frames or display cases can be interlocked or interconnected to one another to create a customized or user-defined grid or layout for the display of virtually any item therein as desired.

SUMMARY OF THE INVENTION

Accordingly, the present invention is generally directed to an interlocking frame or display case that can be selectively interconnected to a plurality of other similarly constructed frames or display cases to create a linear array, a grid or other arrangement of frames. More in particular, the frame or display case includes a plurality of toggle cylinders or locking tabs each of which include a hook latch or arm that can be selectively and independently manipulated to protrude from a frame body. For example, the locking tabs of at least one embodiment may be rotationally disposed within the frame body and disposable between a recessed position and an extended or locked position. When in the recessed position, the locking tabs are recessed or hidden within the frame body. Rotational movement of the locking tab will protrude the hook or arm out from the frame body such that it can engage with a correspondingly constructed locking slot of an adjacent frame.

Further features of the frame of at least one embodiment of the present invention includes an adjustable backing piece or plate with one or more pads or cushions disposed thereon. With the item(s) placed within the frame, the backing piece can be secured against the item(s) by adjusting the depth of the backing piece via cooperative rows of teeth formed on an inside surface of the frame within which tabs or ends of the backing piece can be secured.

Once one or more items is/are secured within the frame, the user can align the frame with another similarly or identically constructed frame such that at least one of the locking tabs on one of the frames aligns with at least one of the locking slots of the adjacent frame. Turning the locking tab will extend the hook or arm of the locking tab and cause it to engage the aligned locking slot, thereby connecting the two frames to one another. The user can then repeat this process and create a custom arrangement of interconnected frames or display cases, as desired. The frame(s) can then be hung on a wall or other like support surface via one or more nails, hanging hooks, or other like fasteners or materials.

It should be noted that the frame or display case of the various embodiments can be scaled in size and depth, or otherwise constructed with any size, shape and depth, to accommodate virtually any item to be stored or displayed therein.

These and other objects, features and advantages of the present invention will become more apparent when the drawings as well as the detailed description are taken into consideration.

BRIEF DESCRIPTION OF THE DRAWINGS

FIG. 9A is a close-up cut-away view of a locking slot and a locking tab of two adjacent frames with the locking tab disposed in the retracted position as disclosed in accordance with at least one embodiment of the present invention.

FIG. 9B is a close-up cut-away view of a locking slot and a locking tab of two adjacent frames with the locking tab disposed in the extended or locked position as disclosed in accordance with at least one embodiment of the present invention.

FIG. 10A is a simplified close-up cut-away view of a locking slot and a locking tab of two adjacent frames with the locking tab disposed in the retracted position as disclosed in accordance with at least one embodiment of the present invention.

FIG. 10B is a simplified close-up cut-away view of a locking slot and a locking tab of two adjacent frames with the locking tab disposed in the extended or locked position as disclosed in accordance with at least one embodiment of the present invention.

FIG. 11A is a top perspective view of the locking tab as disclosed in accordance with at least one embodiment of the present invention.

FIG. 11B is a bottom perspective view thereof.

FIG. 11C is a top view thereof.

FIG. 11D is a bottom view thereof.

FIG. 11E is a left-side view thereof.

FIG. 11F is a front view thereof.

Like reference numerals refer to like parts throughout the several views of the drawings provided herein.

DETAILED DESCRIPTION OF THE INVENTION

Figure 1:
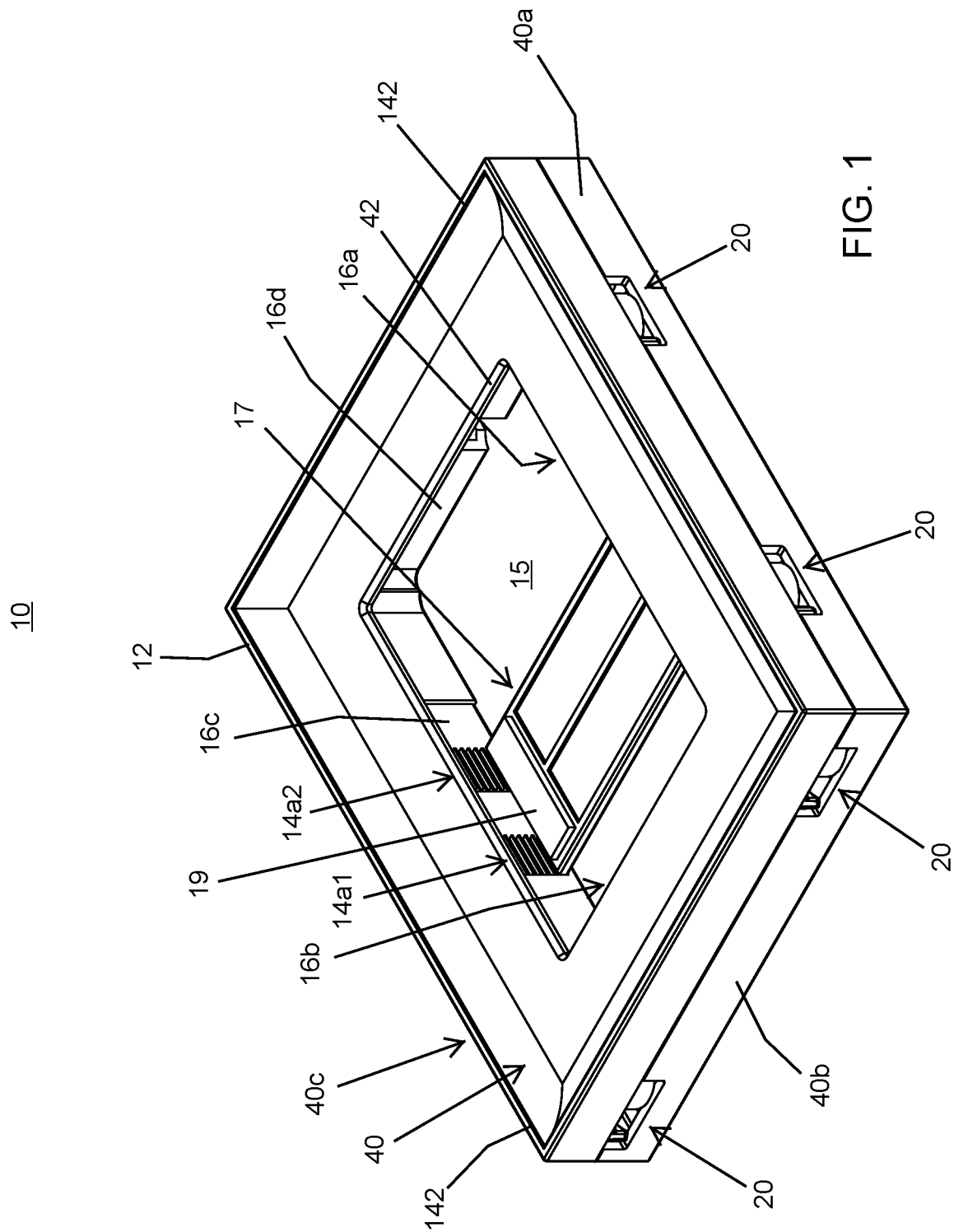
FIG. 1 is a front-right-bottom perspective view of the interlocking frame as disclosed in accordance with at least one embodiment of the present invention.

As shown in the accompanying drawings, and with particular reference to FIG. 1, for example, the present invention is directed to an interlocking frame assembly or display case, generally referenced as 10. More specifically, the frame assembly 10, as described herein, includes a frame body 12 defining an interior portion or area 15 within which one or more items (not shown) of various shapes and sizes can be placed and displayed. As just an example, the frame 10 of the various embodiments of the present invention can be used to hold, retain, or display one or more cards (e.g., playing cards, collectible cards, trading cards, etc.), comic books, photographs, drawings, sports balls, jerseys, action figures, stamps, memorabilia, collectible items, or other items, media, etc. regardless of shape, size, depth, and whether substantially two dimensional or three-dimensional.

Figure 4:
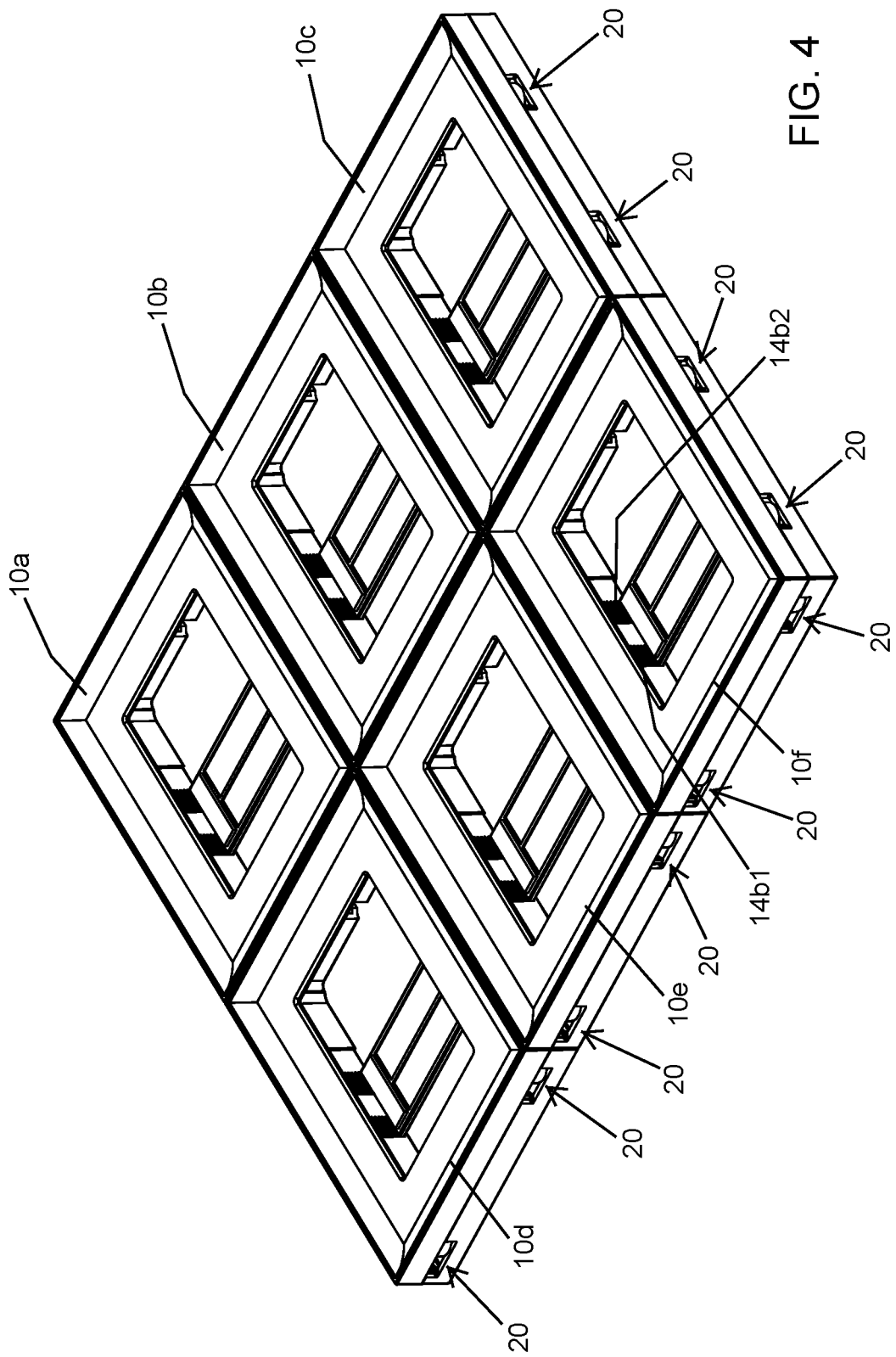
FIG. 4 is a front-right-bottom perspective view of a plurality of frames interconnected with one another to form a grid of six frames as disclosed in accordance with at least one embodiment of the present invention.
Figure 5:
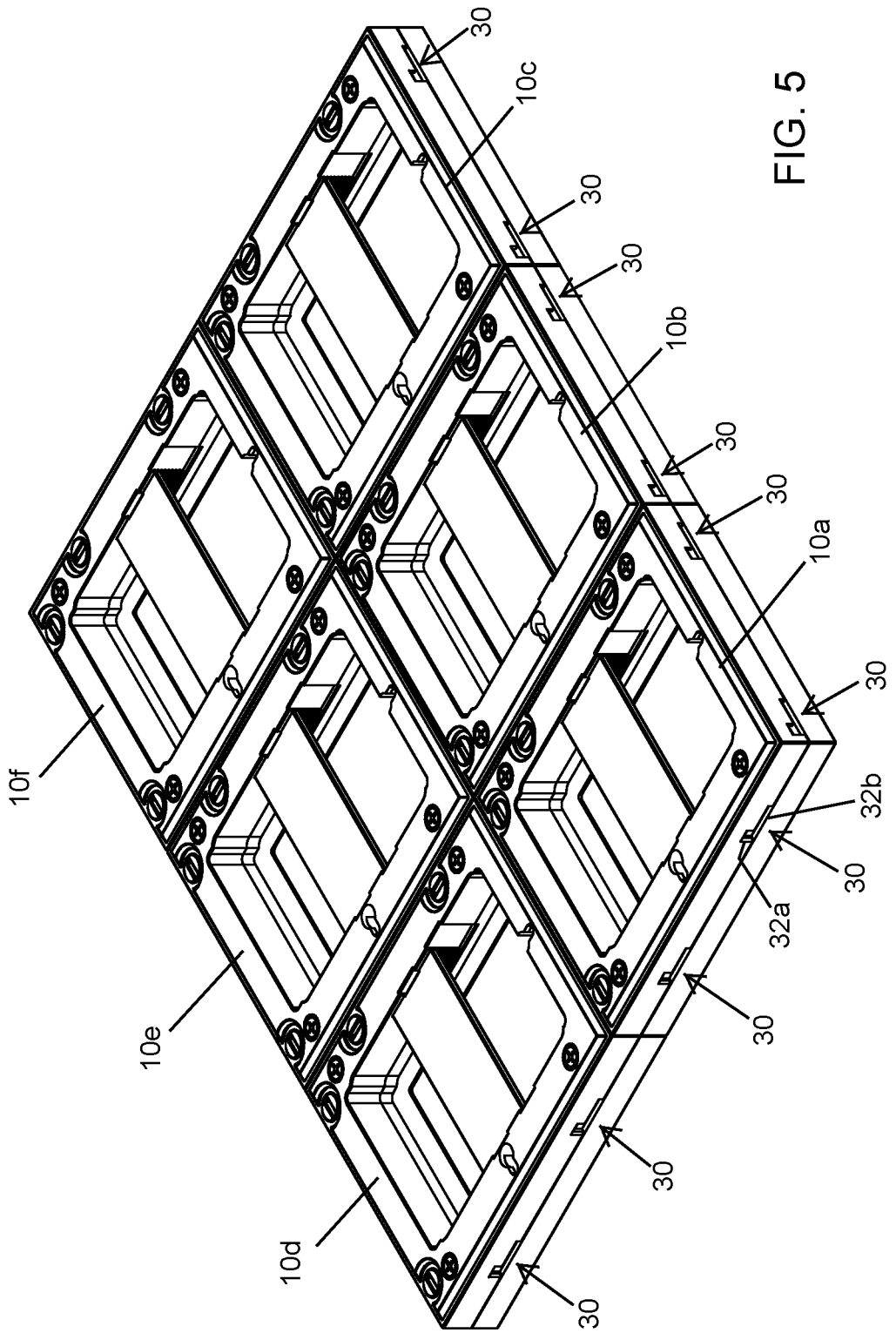
FIG. 5 is a rear-top-left perspective view thereof.

More specifically, as described herein, the frame 10 or display case of the various embodiments of the present invention also include one or more locking latches or locking tabs, generally referenced as 20, which correspondingly and removably engage with or to correspondingly structured locking slots 30 of an adjacently disposed or adjoining frame of similar or identical construction. In this manner, a plurality of frames 10 or display cases can be selectively interconnected or locked to one another in order to create customized displays or grids of the combined frames 10. For example, FIGS. 4 and 5 illustrate an exemplary grid or collection of frames 10a-10f of similar or identical construction interconnected to one another via the corresponding locking tabs 20 and locking slots 30 (not shown in FIGS. 4 and 5). More specifically, each of the frames 10a-10f shown in the embodiment of FIGS. 4 and 5 are identical to the frame 10 shown in FIGS. 1 through 3F.

In any event, with reference to FIGS. 1 through 3F, the interior portion 15 of the frame 10 is at least partially enclosed by interior walls 16a-16d and in some cases a backing plate 17. A front face 40 includes an open area or window 42 through which the interior portion 15, and any items disposed or displayed therein, is visible. In some cases, a clear, transparent or translucent overlay (not shown) may be disposed within or over the window 42, while in other embodiments, the window 42 may be open.

Figure 2:
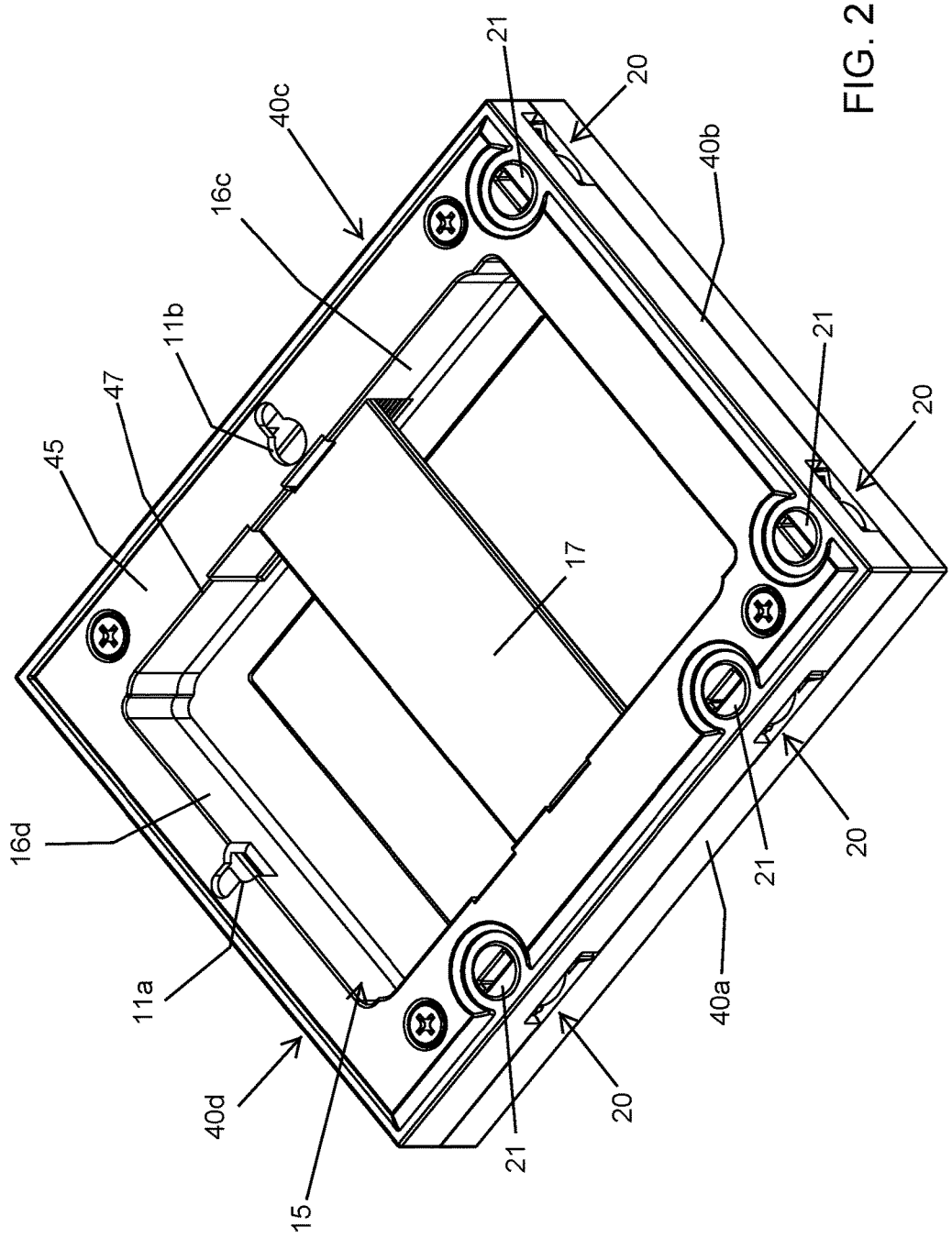
FIG. 2 is a rear-right-bottom perspective view of the interlocking frame illustrated in FIG. 1.
Figure 3:
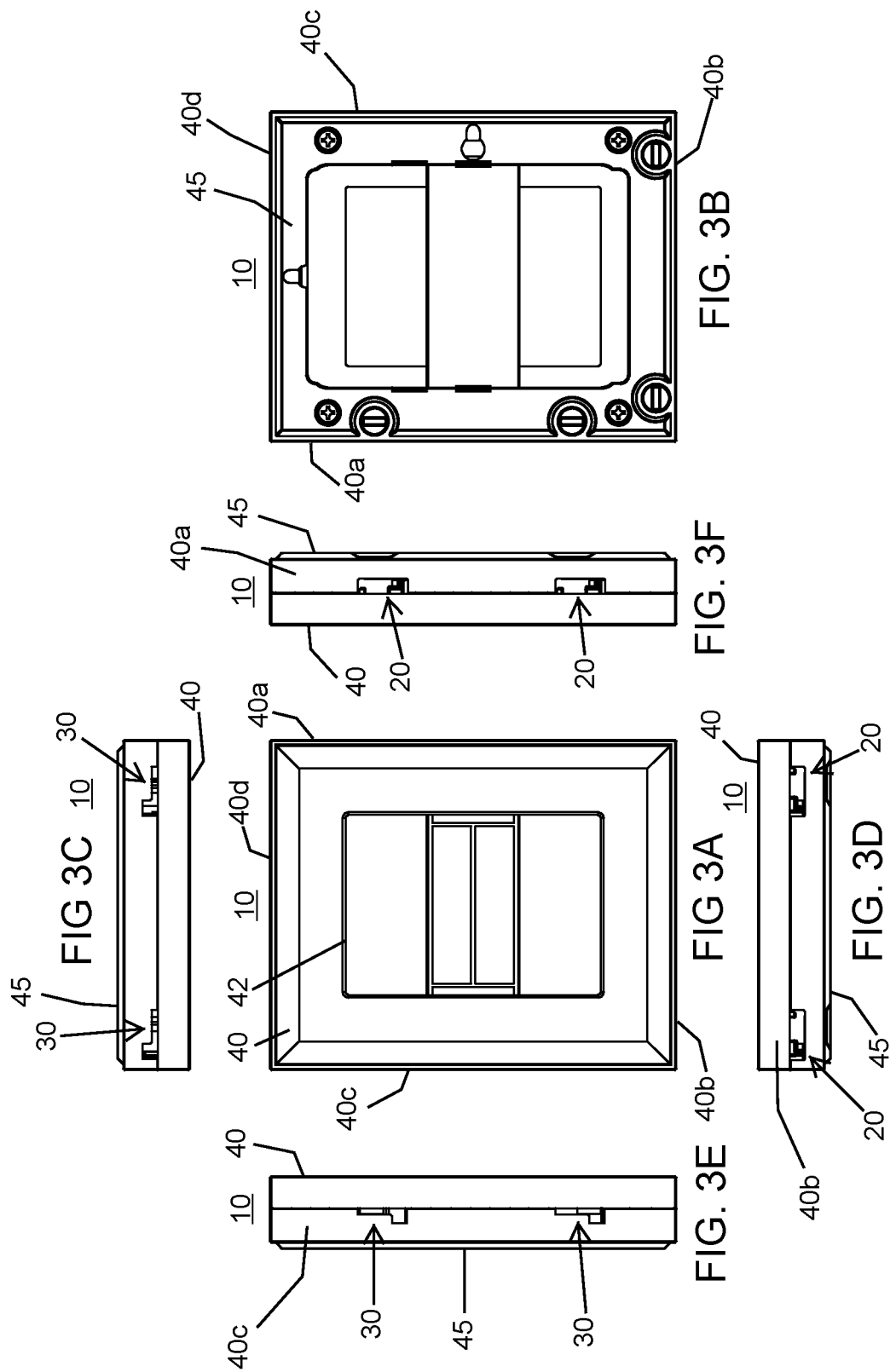
FIG. 3A is a front view of the interlocking frame as disclosed in accordance with at least one embodiment of the present invention.
FIG. 3B is a rear view thereof.
FIG. 3C is a top view thereof.
FIG. 3D is a bottom view thereof.
FIG. 3E is a left-side view thereof.
FIG. 3F is a right-side view thereof.

FIG. 2 illustrates a rear-bottom-right perspective view of the frame 10 and shows the bottom face 45 and corresponding opening or window 47 thereof. As will be described herein, the backing plate 17 can be removed and/or adjusted through the back face 42 and/or window 47 thereof in order to insert and retain one or more items within, or to remove one or more items from the interior portion 15 of the frame 10.

In addition, and still referring to FIGS. 1 through 3F, the frame 10 or frame body 12 of at least one embodiment includes a plurality of external or peripheral walls 40a-d. As provided herein, the peripheral walls may be referred to as a first peripheral wall 40a, second peripheral wall 40b, third peripheral wall 40c and fourth peripheral wall 40d in order to correspond with the exemplary embodiment of the frame 10 shown in the illustrated embodiment, which shows four external or peripheral walls 40a-d in the form or shape of a cube or cuboid. However, it should be noted that other embodiments may include more (e.g., five, six, seven, eight or more) or less (e.g., three) external peripheral walls, and as such, the shape of the frame 10 itself may be in the form other three-dimensional shapes in addition to or instead of a cube or cuboid.

Furthermore, the frame 10 includes at least one latch or locking tab 20 which is selectively disposable between a retracted position (e.g., as shown in FIGS. 7A, 7B, 9A, and 10A) and an extended or locked position (e.g., as shown in FIGS. 8A, 8B, 9B and 10B). As will be described herein, in accordance with at least one embodiment of the present invention, the one or more locking tabs 20 each include an arm 22 or extension that extends beyond a corresponding one of the peripheral walls 40a-40d when the locking tab 20 is disposed in the extended or locked position. In this manner, the arm 22 can engage with or to a locking slot 30 of an adjacent or adjoining frame in order to lock or connect therewith, as described and illustrated herein.

In some embodiments, when the locking tab 20 is disposed in the retracted position, the entire locking tab 20, including the arm 22 thereof, is retracted into or disposed within the frame body 12. In other words, in some embodiments, when the locking tab 20 is retracted, it is fully retracted within the frame body 12 such that it does not extend beyond the corresponding or nearest peripheral wall 40a-40d or frame body 12. It should be noted however, that in other embodiments or implementations, it is contemplated that a portion of the locking tab 20 may extend beyond the frame 20 even when the locking tab 20 is disposed in the retracted position.

Moreover, the frame 10 or frame body 12 thereof also includes at least one locking slot, generally referenced as 30. As described herein, the locking slot(s) 30 are configured to engage with or to a locking tab 20 of an adjacent or adjoining frame 10.

In this manner, at least one of the locking tab(s) 20 of a particular frame 10 is/are positioned to engage or interconnect with one or more corresponding locking slots of a first adjoining frame (e.g., in the exemplary embodiment shown, an adjoining frame disposed against or adjacent to peripheral walls 40a and/or 40b). Similarly, at least one of the locking slot(s) 30 of a particular frame 10 are positioned to engage or interconnect with locking tab(s) of a second adjoining frame (e.g., in the exemplary embodiment shown, an adjoining frame disposed against or adjacent to peripheral walls 40c and/or 40d).

More specifically, in the exemplary embodiment illustrated in the Figures, the frame 10 includes a plurality of latches or locking tabs 20 and a plurality of locking slots 30 positioned on or adjacent to the peripheral walls 40a-40d in a manner such that a plurality of frames 10 can interconnect to one another. For example, the frame 10 may include one or more locking tabs 20 disposed on, at or adjacent to two peripheral walls, such as first peripheral wall 40a and second peripheral wall 40b. Similarly, the same frame 10 may include one or more locking slots 30 disposed on, at or adjacent to different peripheral walls, such as third peripheral wall 40c and fourth peripheral wall 40d.

In particular, the frame 10 as shown in the Figures, includes two locking tabs 20 on, at or adjacent to the first peripheral wall 40a, two locking tabs 20 disposed on, at or adjacent to the second peripheral wall 40b, two locking slots 30 disposed on, at or adjacent to the third peripheral wall 40c and two locking slots 30 disposed on, at or adjacent to the fourth peripheral wall 40d. In the embodiment shown, the first and second peripheral walls (corresponding to the locking tabs 20) share a common corner and the third and fourth peripheral walls (corresponding to the locking slots 30) share a common corner. Accordingly, the two locking tabs 20 of the first peripheral wall 40a of one frame will align with and interconnect to the two locking slots 30 of the third peripheral wall 40c of an adjacent or adjoining frame. Similarly, the two locking tabs 20 of the second peripheral wall 40b will align with and interconnect to the locking slots 30 of the fourth peripheral wall 40d of another adjacent or adjoining frame.

It should be noted, however, that other configurations and/or positioning of the locking tab(s) 20 and/or locking slot(s) 30 are contemplated within the full spirit and scope of the various embodiments of the present invention. For instance, any one or more of the peripheral walls 40a-40d may include any number (e.g., zero and up) of locking tabs and/or locking slots. For instance, a single peripheral wall may include both a locking tab and a locking slot. In any case, the locking tab(s) of one frame will align with and removably connect to the locking slot(s) of an adjoining or adjacent frame, within the scope of the present invention.

With reference to FIGS. 6 through 11F, the operation of the locking tabs 20 and locking slots 30 of at least one embodiment of the present invention will now be described. In particular, the locking tabs 20 of at least one embodiment of the present invention are selectively and independently rotationally disposable between the retracted position and the extended or locked position. For instance, a manipulable or externally accessible portion 21 of each locking tab 20 may be accessible externally from the frame 10 in order to manually manipulate or manually rotate the locking tab 20 between the retracted and extended positions. In the illustrated embodiment, portion 21 is accessible on or through the rear face 45 of the frame 10, although it is contemplated that in other embodiments, the manipulable portion may be accessible at or through other surfaces of the frame 10, including, the front face 40 or the nearest or corresponding peripheral wall 40a-d, as just an example.

In any event, the manipulable portion 21 of the locking tab 20 of at least one embodiment includes a slot or recess therein which can be engaged with a corresponding tool, including but in no way limited to a flathead screw driver. In such a case, a user may insert the end of a flathead screwdriver or other like tool into the slot or recess on the manipulable portion 21 of the locking tab 20 in order to manually rotate the locking tab 20 from the recessed position to the extended position or from the extended position to the recessed position. Of course, other manipulable features may be implemented in or on the portion 21 of the locking tab 20, including, but in no way limited to a crossed recess (e.g., for manipulation with a Phillips head screwdriver or the like), a star-shaped recess, an octagonal shaped recess (e.g., for manipulation with a Allen wrench or the like), etc. Furthermore, protrusions extending from the manipulable portion 21 may be implemented, such as a tab, knob or other extension that can be manipulated with other types of tools or by a user's hand without the use of a tool or other additional device.

Figure 6:
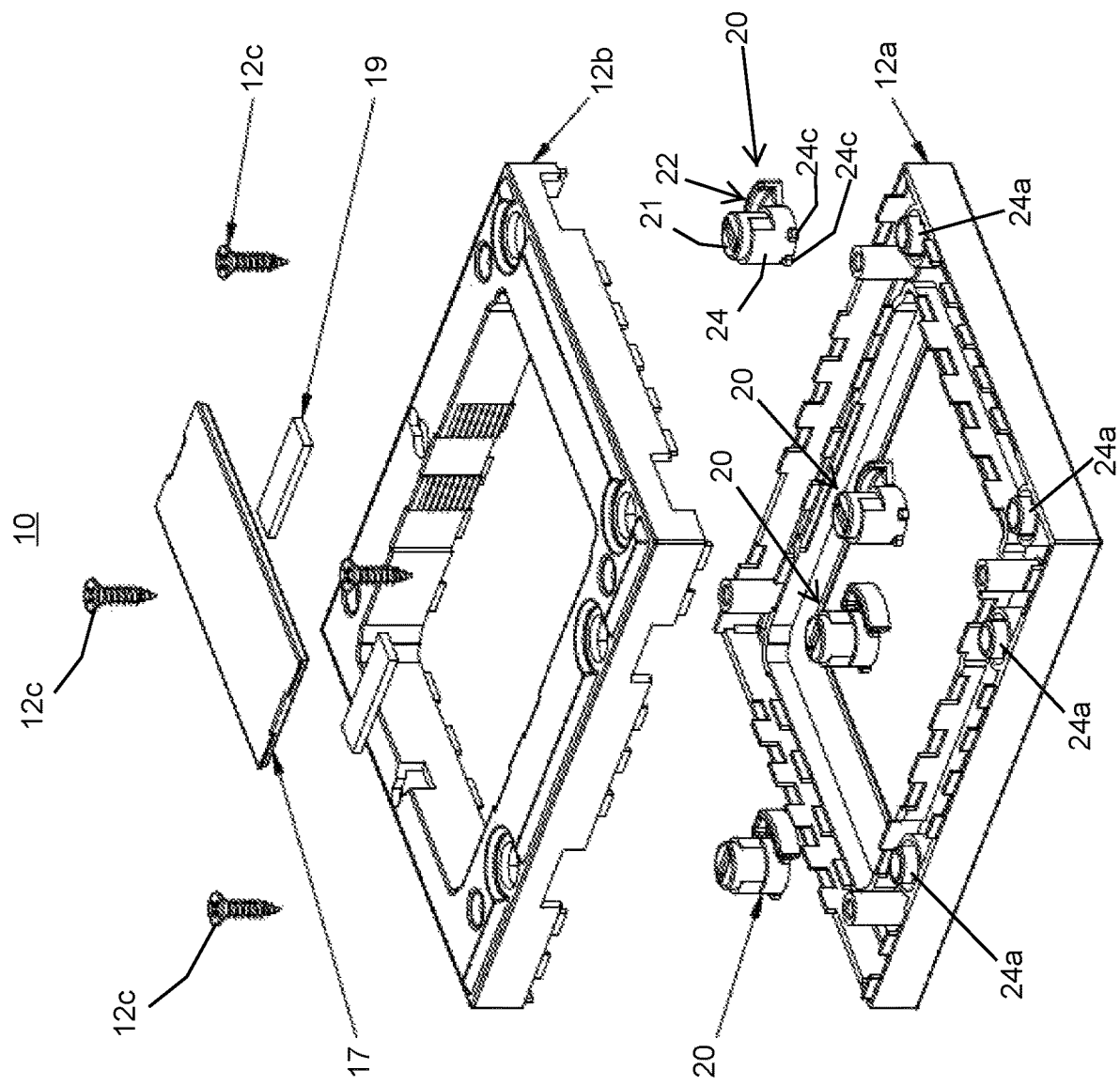
FIG. 6 is an exploded view of the frame as disclosed in accordance with at least one embodiment of the present invention.

With reference now to the exploded view of FIG. 6 as well as FIGS. 11A-11F, each of the locking tabs 20 of at least one embodiment include a base 24 which is rotationally disposed within the frame body 12, with the arm 22 extending out from a portion thereof. In particular, the base 24 of at least one embodiment may be disposed upon a seat 24a which includes a rounded or cylindrical extension fixed to the frame body 12. The base 24 may be seated or disposed upon the cylindrical extension or seat 24a, for example, with the cylindrical extension disposed within an interior portion 24b of the base 24.

Furthermore, the locking tab(s) 20 of at least one embodiment may also include one or more stops or protrusions 24c extending from the base 24. The stops or protrusions 24c may frictionally engage an interior section of the frame body 12 and/or in some cases fit within corresponding recesses within the frame body 12 in order to at least partially frictionally or otherwise restrict some rotational movement of the locking tab 20. For example, the stops or protrusions may allow the locking tab 20 to frictionally engage at the fully recessed and fully extended positions.

Moreover, in at least one embodiment, the arm 22 which extends from the base 24 of the locking tab 20 includes an engagement wall 22a which engages with or contacts a corresponding locking surface 34 of a locking slot 30, as will be described herein. In some embodiments, the engagement wall 22a of the locking tab 20 is connected to the rotational base 20 via a longitudinal ledge 22b. For example, as shown in FIGS. 11A, 11B and 11C, the longitudinal ledge 22 extends from an external surface of the base 24 and terminates at the engagement wall 22a. In other words, the longitudinal ledge 22b is connected at one end to the rotational base 24 and at the other, opposing end, to the engagement wall 22a.

Further, as shown in FIGS. 11A and 11C, for example, the engagement wall 22a may be attached to the rotational base 24 via an end wall or connecting wall 22c. For instance, the connecting wall 22c may extend from the rotational base 24 and connect to one end of the engagement wall 22a, as shown. In the embodiment illustrated, the engagement wall 22a is connected to the rotational base 24 via both a longitudinal ledge 22b and a connecting wall 22c, however, it is contemplated that in other embodiments, the engagement wall 22 may be connected to the rotational base 24 via the longitudinal wall 22b or the connecting wall 22c, or other attachment extensions.

In the embodiments which include the longitudinal ledge 22, as shown in the Figures, a cross-section of the arm 22, for example, taken along a perpendicular plane or axis P to the longitudinal ledge 22b and engagement wall 22a defines an L-shaped configuration or a substantially L-shaped configuration with one section of the L-shape defined by the longitudinal ledge 22b and the other section of the L shape defined by the engagement wall 22a. It should be noted that the term L-shaped is used as merely illustrative that the longitudinal ledge 22b and the engagement wall 22a form an angular connection to one another. The angular connection may be ninety degrees, although it may be more or less than ninety degrees and still fall with the L-shaped configuration and within the full spirit and scope of the present invention.

Still referring to FIGS. 11A-11F, in at least one embodiment the engagement wall 22a includes an arcuate configuration or otherwise includes a curvature with an interior concave surface 22d that faces the base 24. In some cases, the concave or curved surface 22d of the engagement wall 22a may be coaxial with or other concentric with the base 24 sharing a common axis A. Other embodiments, however, may have different configurations wherein the concave or curved surface 22d and the base 24 may have different curvatures, different shapes or otherwise may not be coaxial.

Turning now to FIGS. 3C, 3E, 5 and 7A-10B, the locking slots 30 of at least one embodiment of the present invention will be described. More specifically, the locking slots 30 of at least one embodiment includes an opening or channel, generally referenced as 32, and a locking surface, generally referenced as 34. The opening or channel 32 is disposed on or through a corresponding peripheral wall of the frame body 12. In the exemplary embodiments shown in the Figures, the openings or channels 32 are shown as being disposed on or through peripheral walls 40c and 40, although, as described above, in other embodiments the locking slots 30, and therefore the openings or channels 32 thereof, may be disposed on or through other peripheral walls.

In the embodiment illustrated, the opening or channel 32 of the locking slot 30 includes a configuration or shape that corresponds with the cross-sectional shape of the arm 22 such that the arm 22 can correspondingly fit within the opening or channel 32. More specifically, the opening or channel 32 may include an L-shaped or angularly shaped configuration defining a first section 32a and a second section 32b which collectively define a continuous L-shaped or angularly shaped opening. For instance, as the locking tab 20 is rotationally disposed from the retracted position into the extended or locked position, the engagement wall 22a of the arm 22 will correspondingly fit within the first section 32a of the opening while the longitudinal ledge 22b will fit within the second section 32nb of the opening 32. It should be noted that other shapes and configurations of the arm 22 of the locking tab 20 and the opening 32 of the locking slot are contemplated, although the opening 32 of the locking slot is shaped and sized in a manner such that the arm 22, or at least a portion of the arm 22, is able to fit therein and engage the locking slot 30 within the scope of the present invention.

Furthermore, the locking slot 30 of at least one embodiment also includes a locking surface 34 which is configured to engage with or otherwise contact with the engagement wall 22 of the locking tab 20 when the locking tab 20 is locked to the locking slot 30. More specifically, an interior surface of the peripheral wall 40c may include the locking surface 34 adjacent to the opening 32 of the locking slot 30. As an example, the inside surface of the peripheral wall at the area between the first and second segments 32a, 32b of the opening 32 is defined as the locking surface 34 where the engagement wall 22 of the locking tab will engage or contact. In other embodiments or implementations, however, it is contemplated that the locking surface 34 is disposed or defined in a different location or may be separate from the corresponding peripheral wall.

In any event, the locking slot 30 includes a locking surface 34 that is configured to receive, engage with or otherwise be contacted by the engagement wall 22a of the locking tab 20. More specifically, in the embodiment where the engagement wall 22a includes an arcuate or curved configuration, as shown in FIGS. 7A through 10B, the locking surface 34 of the locking slot 30 includes a corresponding arcuate or curved configuration similar or identical to the arcuate or curved configuration of the engagement wall 22a. This allows the arcuate engagement wall 22a to engage with or snugly fit against the locking surface 34 when the locking tab is disposed in the extended or locked position. Of course, other corresponding configurations in addition to or instead of corresponding arcuate or curved configurations between the locking surface 34 and the engagement wall 22a are contemplated and within the full spirit and scope of the present invention.

Furthermore, in some cases, the locking slot 30 may also include a notch 35 disposed at a distal end of the locking surface 34, for example as shown in FIGS. 9A and 9B. The notch 35 will catch or receive the distal end of the engagement wall 22a, as shown in FOG. 9B, to further define a locking engagement there between. Also as shown in FIG. 9B, when the locking tab 30 is locked or engaged to the locking slot, the proximal end 37 of the locking surface 34 at the opening 32 will contact or engage with the corresponding proximal end of the engagement wall 22a, the connecting or end wall 22c and/or the joint where the engagement wall 22a and the connecting or end wall 22c meet.

Figure 7A:
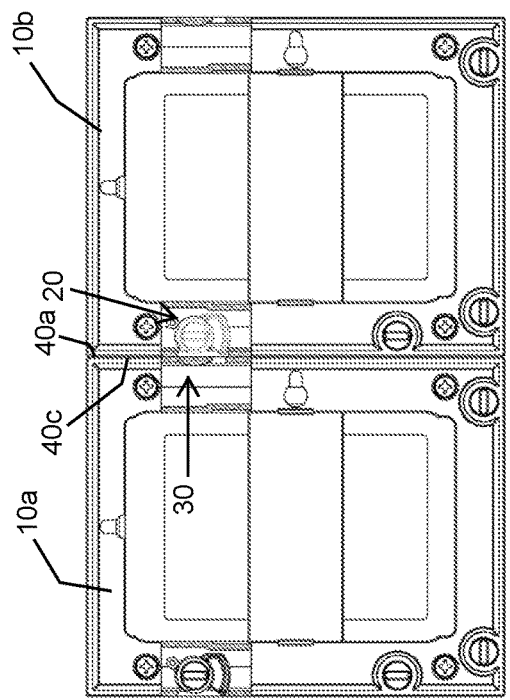
FIG. 7A is a rear partial cut-away view of two adjacent frames with each of the locking tabs disposed in the retracted position as disclosed in accordance with at least one embodiment of the present invention.
Figure 7B:
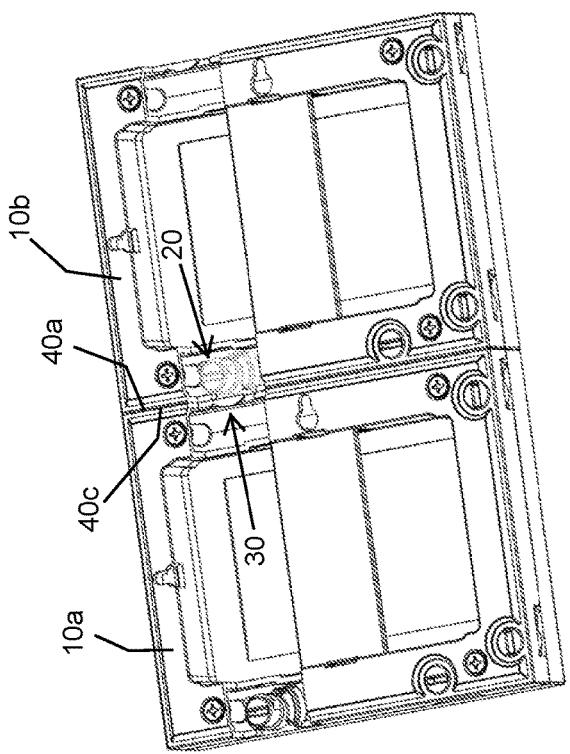
FIG. 7B is a rear partial cut-away perspective view thereof.

Still referring to FIGS. 7A through 10B, it is noted that FIGS. 7A and 7B illustrate partial cut-away views of two adjacently disposed frames 10a, 10b with the locking tabs 30 at the peripheral wall 40 disposed in the retracted position and unlocked relative to the locking slots 30 disposed on the adjoining peripheral wall 40a. Similarly, FIGS. 8A and 8B illustrate the same partial cut-away views of the adjacently disposed frames 10a, 10b, although with the locking tabs 20 disposed in the locked or engaged relation with the corresponding locking slots 30 on the adjoining peripheral wall.

Figure 8A:
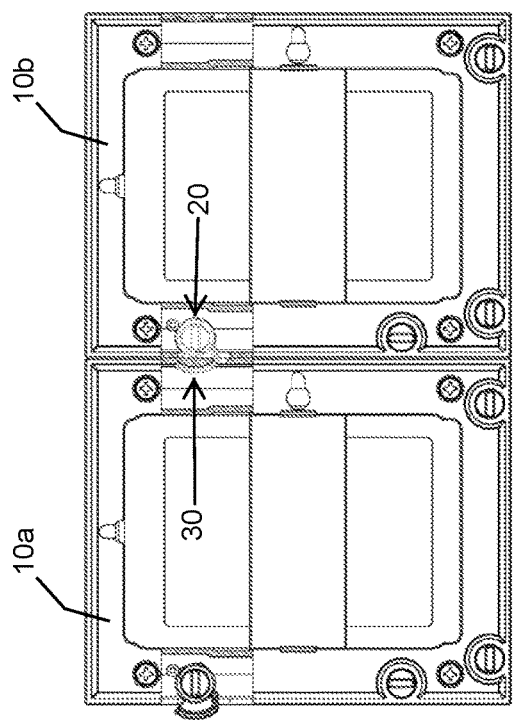
FIG. 8A is a rear partial cut-away view of two adjacent frames with two of the locking tabs disposed in the extended position as disclosed in accordance with at least one embodiment of the present invention.
Figure 8B:
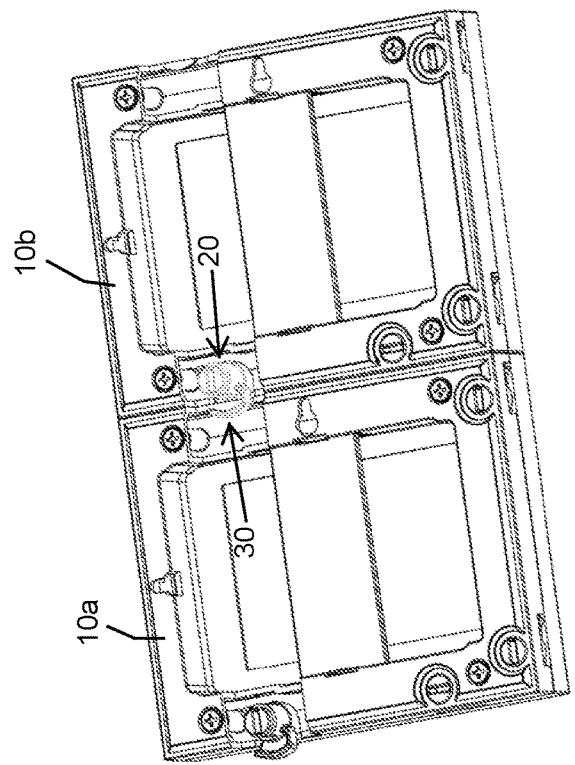
FIG. 8B is a rear partial cut-away perspective view thereof.

FIGS. 9A and 9B show a close-up view of the corresponding locking tab and slot shown in FIGS. 7A and 8A, respectively. FIGS. 10A and 10B are provided as a more simplified view of the locking tab 20 of at least one embodiment disposed in a retracted or unlocked position (FIG. 10A) and an extended or locked position (FIG. 10B) relative to a corresponding locking slot 30. As shown in FIGS. 7A through 10B, rotation of the locking tab 30 from the retracted or unlocked position (e.g., FIGS. 7A, 7B, 9A, and 10A) (in a clockwise direction of the exemplary embodiment shown) causes the arm 22 of the locking tab 20 to extend out of the frame body 12 and beyond the corresponding or nearest peripheral wall 40a. With the adjacent frame 10a disposed in an abutting relation so that the locking slot 30 of one frame 10a aligns with the locking tab 20 of the other frame 10b, the arm 22, and in particular, the engagement wall 22a thereof, will fit within the opening 32 of the locking slot 30 and will engage or contact the locking surface 34 that is located within the frame body.

Unlocking the adjoining frames 10a, 10b is accomplished by rotating the locking tab 20 in the opposite direction (e.g., counter-clockwise in the exemplary embodiment shown). This will disengage the engagement wall from the locking surface and will retract the locking tab 20 back into the body of frame 10b.

Figure 12A:
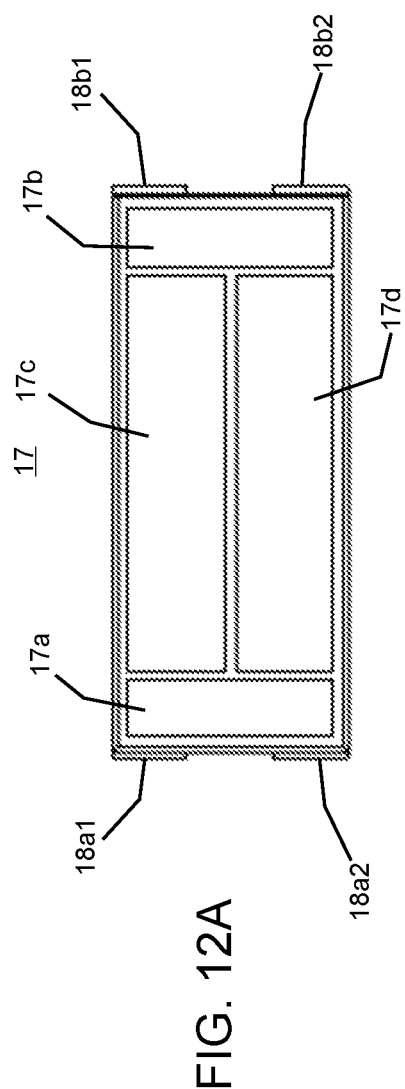
FIG. 12A is a front view of the backing piece as disclosed in accordance with at least one embodiment of the present invention.
Figure 12B:
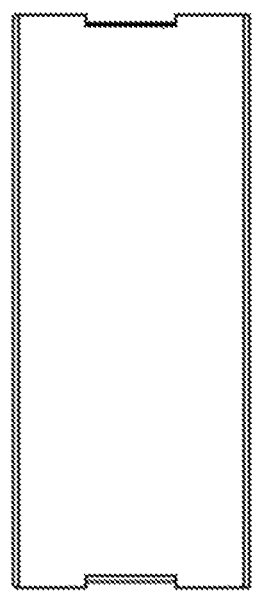
FIG. 12B is a rear view thereof.
Figure 12C:
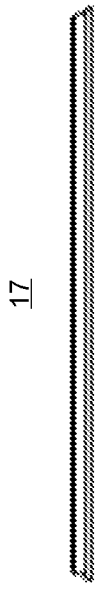
FIG. 12C is a side view thereof.

Additional features of certain embodiments of the present invention include a backing plate 17, and in particular, a depth adjustable backing plate 17. More specifically, with reference again to FIGS. 1 and 2, for example, and as shown in FIGS. 12A through 12C, the frame 10 of at least one embodiment includes a backing plate that is disposable within the interior portion 15 of the frame 10 or frame body 12 and which can be adjusted along various depths to selectively define the depth or size of the interior area within which the one or more items (not shown) can be displayed. This can be particularly beneficial for securing or displaying items of different sizes widths or depths within the frame 10.

More in particular, in at least one embodiment, at least one, but more practically at least two opposing internal walls such as peripheral walls 16a, 16c may include a plurality of adjacently disposed and closely spaced elongated ribs 14a1, 14a2, 14b1, 14b2 which define channels or notches there between. In this manner, one or more corresponding ends or edges of the backing plate 17, such as 18a1, 18a2, 18b1, 18b2 (as shown in FIG. 12A) may be selectively disposable within the notches or channels defined by the closely spaced ribs. Accordingly, from the rear surface of the frame, the backing plate 17 may be aligned with the elongated ribs and pushed into the interior portion of the frame at a selected depth with the ends or edges of the backing plate 17 clicking and engaging with the notches defined between the elongated ribs.

In some embodiments, one or more pads or inserts 19 may be secured or attached to the backing plate 17 and facing toward the interior area 15 of the frame. The pad(s) or insert(s) 19 may be constructed of foam, rubber or other soft, resilient material that can be pressed against the item(s) displayed within the frame or otherwise used as a soft cushion to support the item(s) displayed therein. For example, with reference to FIG. 12A, the backing plate 17 may include one or more recessed areas 17a-d within which one or more pads or inserts 19 can be disposed. In some cases, the pads or inserts 19 may be secured or attached to the two outer or peripheral areas 17a-b disposed adjacent opposing ends of the backing plate 17, although interior areas 17c-d may also be used to support one or more pads or inserts 19 as desired or as needed.

Figure 13:
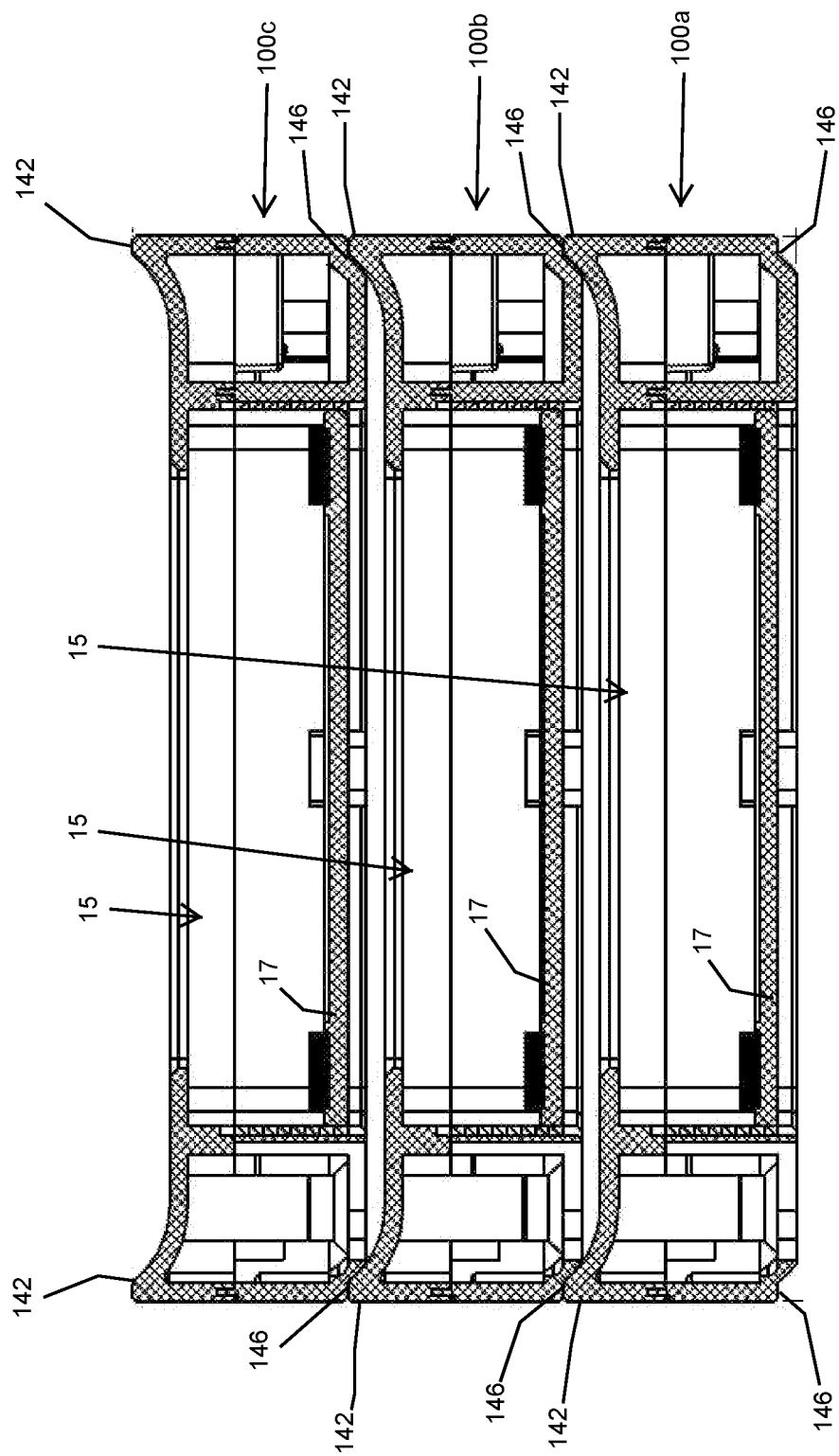
FIG. 13 is a cut-away end view of a plurality of frames disposed in a stacked or nested orientation relative to one another as disclosed in accordance with at least one embodiment of the present invention.

Yet another feature of at least one embodiment of the present invention includes the ability to easily stack or nest a plurality of frames 10 together. More specifically, with reference to FIG. 13, a cut-away end view of a plurality of stacked or nested frames 100a, 100b, 100c is shown. In particular, the frames 100a-c shown in FIG. 13 are of similar or identical construction as the frame 10 shown in FIGS. 1 and 2. The cut-away view is taken along a line extending through the frame from one side to another side (e.g., between peripheral walls 40a to 40c). More specifically, the top surface 40 of the frame 100a-c of at least one embodiment includes a raised lip or edges that extends at least partially around the periphery of the frame, although in some embodiments around the entire periphery of the frame. In other words, the periphery of the front face 40 is raised via a lip 142, as shown.

The rear surface or face 45 of the frame 100a-c of at least one embodiment includes a beveled edge or outer ledge 146 which is cooperatively contrasted relative to the raised lip 142. More specifically, the raised lip 142 of one frame (e.g., frame 100a) cooperatively fits or nests within the beveled edge 146 of a stacked frame (e.g., frame 100b), therefore allowing a plurality of frames 100a-c to be stacked or nested upon one another, in the manner shown in FIG. 13, for example.

Accordingly, a plurality of frames 100a-c can be stacked or nested for purposes of facilitating storage or shipping of a number of different frames. It is also contemplated that a number of frames 100a-c can be stacked or nested upon one another for purposes of display, as well. For instance, in some cases, as desired, different items may be stored or displayed in each of the different stacked frames 100a-c. In other cases, however, it is contemplated that by stacking or nesting a plurality of frames, for example, in the manner shown in FIG. 13, the interior areas 15 of the stacked frames 100a-c can collectively define a combined internal area which can hold or display larger items. More specifically, with reference to FIG. 13, it is contemplated that the backing plate 17 of frames 100b, 100c can be removed, and therefore, in the embodiment where the window 42 of the frames 100a, 100b is open, stacking the frames 100a-c can function to extend the interior area 15 within which one or more items can be displayed.

Moreover, it should be noted that, with reference again to the exploded view of FIG. 6, in at least one embodiment the frame 10 or frame body 12 is constructed as including at least two sections—a front section 12a and a rear section 12b. More specifically, front and rear sections 12, 12b may be secured to one another via a plurality of fasteners 12c that pass through corresponding fastener holes in the rear section 12b and fasten to corresponding or aligned fastener tubes in the front section 12a. Other manners in which to connect or fasten the two sections 12a, 12b are contemplated within the full spirit and scope of the present invention, including, but not limited to clips, snaps, hooks, clamps, etc. In addition, the frame 10 and/or frame body 12 thereof may be constructed of a single piece or a single section (as opposed to two separate sections 12a, 12b) or multiple sections or components and still fall within the scope of the present invention.

As yet another feature, the frames 10 of at least one embodiment of the present invention may include one or more hanging supports 11a, 11b accessible on the rear of the frame, for example, as shown in FIG. 2. More specifically, the hanging support(s) 11a, 11b may be used to hang the one or more frames 10 to a wall or other like surface, for example, by inserting a fastener, hook or other like hanger (not shown) into the support 11a, 11b while secured to the wall or other surface. In some embodiments, the frames 10 include supports 11a, 11b on two adjacent walls, e.g., on a transverse wall as shown by support 11a, and a longitudinal wall as shown by support 11b. This allows the frame 10 or a plurality of interconnected frames to be attached to a wall or other support in either one of two orientations (e.g., a transverse portrait orientation or a longitudinal landscape orientation).

In this manner, some embodiments of the frame 10 or frame body 12, including front and rear sections 12a, 12b thereof, may be constructed out of plastic, for example, via 3D printing methods, injection molding methods, or other methods. Of course, other materials, including metal, aluminum, wood, etc. can be used to construct the frame 10 or various portions, components or sections of the frame 10.

It should also be noted again that the frame 10 can be constructed or formed in different shapes and sizes (e.g., different lengths, widths, depths) to accommodate different needs or desires, for example, to display or retain items of different sizes. Further, while a cuboid shape is shown in the Figures, the frame 10 or display case can be formed of virtually any shape with virtually any number of sides or peripheral walls.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. An interlocking frame, comprising:
    a frame body, said frame body comprises:
        an interior portion at least partially enclosed by a plurality of interior walls,
        a front face,
        a rear face, and
        a plurality of peripheral walls,
    said frame body further comprising at least one locking tab selectively disposable between a retracted position and an extended position,
    said at least one locking tab comprises an arm that extends beyond at least one of said plurality of peripheral walls when said at least one locking tab is disposed in said extended position,
    said frame body further comprising at least one locking slot disposed on a different one of said plurality of peripheral walls,
    wherein said at least one locking tab is configured to engage with a locking slot of a first adjoining interlocking frame, and
    wherein said at least one locking slot is configured to engage with a locking tab of a second adjoining interlocking frame.

2. The interlocking frame as recited in claim 1 wherein said at least one locking tab is rotationally connected to said frame body wherein rotational movement of said at least one locking tab selectively disposes said locking tab between said retracted position and said extended position.

3. The interlocking frame as recited in claim 2 further comprising a plurality of locking tabs, wherein at least one of said locking tabs is disposed adjacent a first one of said plurality of peripheral walls, and wherein another one of said plurality of locking tabs is disposed adjacent a second one of said plurality of peripheral walls.

4. The interlocking frame as recited in claim 3 further comprising a plurality of locking slots, wherein at least one of said locking slots is disposed on a third one of said plurality of peripheral walls, and wherein another one of said plurality of locking slots is disposed on a fourth one of said plurality of peripheral walls.

5. The interlocking frame as recited in claim 1 wherein said at least one locking tab comprises a rotational base disposed within said frame body, said arm being attached to and extending out from at least a portion of said rotational base.

6. The interlocking frame as recited in claim 5 wherein said arm comprises an arcuate engagement wall with an interior concave surface facing said base.

7. The interlocking frame as recited in claim 6 wherein said at least one locking slot comprises an opening and an internal locking surface disposed adjacent said opening.

8. The interlocking frame as recited in claim 7 wherein said internal locking surface comprises a curved configuration corresponding to said interior concave surface of said arcuate engagement wall of said at least one locking tab.

9. The interlocking frame as recited in claim 1 further comprising an adjustable backing plate disposed within said interior portion of said frame body and engaged to at least two opposing ones of said plurality of interior walls.

10. The interlocking frame as recited in claim 9 wherein said at least two opposing ones of said plurality of interior walls comprise a plurality of adjacently disposed elongated ribs defining notches there between, wherein opposing edges of said adjustable backing plate are disposable within said notches.

11. An interlocking frame for selective engagement with a plurality of adjoining interlocking frames, said interlocking frame comprising:
    a frame body, said frame body comprises:
        an interior portion at least partially enclosed by a plurality of interior walls,
        a front face,
        a rear face, and
        a plurality of peripheral walls, said plurality of peripheral walls comprising a first peripheral wall, a second peripheral wall, a third peripheral wall and a fourth peripheral wall,
    a plurality of locking tabs each selectively and independently rotationally disposable between a retracted position and an extended position relative to said frame body, wherein at least one of said plurality of locking tabs is disposed adjacent said first peripheral wall, and at least another one of said plurality of locking tabs is disposed adjacent said second peripheral wall,
    wherein each of said plurality of locking tabs comprises an arm that extends beyond said frame body when disposed in said extended position, and
    a plurality of locking slots, wherein at least one of said plurality of locking slots is disposed on said third peripheral wall and at least another one of said plurality of locking slots is disposed on said fourth peripheral wall.

12. The interlocking frame as recited in claim 11 wherein said first peripheral wall and said second peripheral wall share a common corner, and wherein said third peripheral wall and said fourth peripheral wall share an oppositely disposed common corner.

13. The interlocking frame as recited in claim 11 wherein each of said plurality of locking tabs comprises a base rotationally disposed within said frame body, said arm being attached to and extending out from at least a portion of said base.

14. The interlocking frame as recited in claim 13 wherein said arm comprises an arcuate engagement wall with an interior concave surface facing said base.

15. The interlocking frame as recited in claim 14 wherein said arcuate engagement wall is attached to said base via a longitudinal ledge and an end wall.

16. The interlocking frame as recited in claim 15 wherein each of said plurality of locking slots comprise an opening and an internal locking surface disposed adjacent said opening.

17. The interlocking frame as recited in claim 16 wherein said internal locking surface of each of said plurality of locking slots comprises a curved configuration corresponding to said interior concave surface of said arcuate engagement wall of said plurality of locking tabs.

18. The interlocking frame as recited in claim 17 wherein said arcuate engagement wall and said longitudinal ledge collectively define a cross-sectional L-shaped configuration.

19. The interlocking frame as recited in claim 18 wherein said opening of each of said plurality of locking slots comprise an L-shaped configuration corresponding to said cross-sectional L-shaped configuration of said arcuate engagement wall and said longitudinal ledge.

20. The interlocking frame as recited in claim 19 further comprising an adjustable backing plate disposed within said interior portion of said frame body and engaged to at least two opposing ones of said plurality of interior walls, wherein said at least two opposing ones of said plurality of interior walls comprise a plurality of adjacently disposed elongated ribs defining notches there between, wherein opposing edges of said adjustable backing plate are disposable within said notches.

* * * * *